(12) United States Patent
Tao

(10) Patent No.: US 9,357,600 B2
(45) Date of Patent: May 31, 2016

(54) ELECTRONIC BALLAST-COMPATIBLE LIGHTING DRIVER FOR LIGHT-EMITTING DIODE LAMP

(75) Inventor: Haimin Tao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 138 days.

(21) Appl. No.: 14/237,913

(22) PCT Filed: Aug. 2, 2012

(86) PCT No.: PCT/IB2012/053951
§ 371 (c)(1),
(2), (4) Date: Feb. 10, 2014

(87) PCT Pub. No.: WO2013/024389
PCT Pub. Date: Feb. 21, 2013

(65) Prior Publication Data
US 2014/0203716 A1    Jul. 24, 2014

Related U.S. Application Data

(60) Provisional application No. 61/523,542, filed on Aug. 15, 2011.

(51) Int. Cl.
*H05B 33/08* (2006.01)

(52) U.S. Cl.
CPC ........ *H05B 33/0815* (2013.01); *H05B 33/0803* (2013.01); *H05B 33/083* (2013.01); *Y02B 20/383* (2013.01)

(58) Field of Classification Search
CPC .. H05B 37/02; H05B 33/083; H05B 33/0887; H05B 33/0809; H05B 33/089; H05B 33/0803; H05B 33/0815; H05B 33/0818; H05B 41/28; H05B 41/2828; Y02B 20/341; Y02B 20/342; Y02B 20/19
USPC ...... 315/185 R, 200 R, 209 R, 224–226, 291, 315/307, 308, 312, 247, 294, 51
See application file for complete search history.

(56) References Cited

U.S. PATENT DOCUMENTS 8,044,608 B2 * 10/2011 Kuo ............... H05B 33/0815
                                                315/291
8,502,454 B2 *  8/2013 Sadwick .......... H05B 33/0809
                                                315/291

(Continued)

FOREIGN PATENT DOCUMENTS

WO    2010027254 A1    3/2010
WO    2010131160 A1    11/2010

(Continued)

*Primary Examiner* — Haissa Philogene

(57) ABSTRACT

A lighting driver includes a rectifier having an input connected to receive AC electrical power from an electronic ballast and having an output connected to supply a current to a plurality of light emitting diodes (LEDs) arranged in series with each other in a string, and a switching device disposed at the output of the rectifier and configured to receive a switching control signal and in response thereto to execute a switching operation to modulate an amount of power supplied to the plurality of LEDs so as to cause an average of the power supplied to the plurality of LEDs to be equal to a target power level. A current sensor may be provided to sense the current, and a controller configured to control the switching operation of the switching device in response to the sensed current.

20 Claims, 12 Drawing Sheets

(56) References Cited

U.S. PATENT DOCUMENTS

| | | | |
|---|---|---|---|
| 8,896,227 B2 * | 11/2014 | Moskowitz | H05B 33/0809 315/209 R |
| 2002/0060526 A1 | 5/2002 | Timmermans et al. | |
| 2008/0150450 A1 | 6/2008 | Starr et al. | |
| 2009/0273290 A1 | 11/2009 | Ziegenfuss | |
| 2010/0033095 A1 | 2/2010 | Sadwick | |

FOREIGN PATENT DOCUMENTS

| | | |
|---|---|---|
| WO | 2011033415 A1 | 3/2011 |
| WO | 2011084525 A1 | 7/2011 |
| WO | 2012131573 A1 | 10/2012 |

* cited by examiner

ELECTRONIC BALLAST-COMPATIBLE LIGHTING DRIVER FOR LIGHT-EMITTING DIODE LAMP

TECHNICAL FIELD

The present invention is directed generally to a lighting driver for driving one or more light-emitting diode (LED) light sources. More particularly, various inventive methods and apparatus disclosed herein relate to an LED-based lamp and an associated lighting driver that can be compatibly retrofit into lighting fixtures having electronic ballasts.

BACKGROUND

There are many commercial settings (e.g., factories, stores, warehouses, etc) that have a large number of lighting fixtures with installed fluorescent tubes (e.g., T8 or T12 tubes) and accompanying electronic ballasts.

It should be noted that electronic ballasts differ from traditional electromagnetic (EM) ballasts in a number of ways. EM ballasts operate at line frequency (e.g., 50 Hz or 60 Hz), while electronic ballasts operate at significantly higher frequencies (e.g., 40 kHz), thereby reducing visible flicker. Electronic ballasts are also typically more efficient than EM ballasts, smaller and lighter than EM ballasts, and sometimes also provide galvanic isolation between their inputs and outputs, while EM ballasts typically do not. On the other hand electronic ballasts are more complex and require more electrical circuitry than EM ballasts.

Illumination devices based on semiconductor light sources, such as light-emitting diodes (LEDs), offer a viable alternative to traditional fluorescent, HID, and incandescent lamps. Functional advantages and benefits of LEDs include high energy conversion and optical efficiency, longer expected lifetime, lower operating costs, and many others.

Accordingly, in some cases there is a desire to replace existing traditional fluorescent light sources with newer, more energy-efficient LED light sources. In particular, in many installations it would be desirable to replace installed fluorescent tube lamps with LED light sources.

There are various LED replacement tube lamps being sold at the market today. In order to operate such LED lamp properly, most of them require rewiring of the existing fluorescent tube lamp lighting fixture, either by removing the existing electronic ballast or by bypassing it. However, this is labor-intensive and increases the total replacement cost. The easiest way to upgrade an existing fluorescent tube lighting unit with an LED light source is by simply removing the old fluorescent tube lamp and replacing it with a new LED tube (TLED) lamp. No rewiring or opening of the fluorescent tube lamp lighting fixture should be required.

Also, one of the major challenges of TLED lamp is to reduce costs. LED driver cost can be a significant part of the total lighting unit, particularly if a switching mode power supply (SMPS) driver is used. Operating with an existing electronic ballast presents an opportunity for reducing the cost of a TLED lamp by utilizing the existing electronic ballast as part of the LED driver system.

Furthermore, energy savings is one of the key advantages for TLED lamp. Because a TLED lamp typically shines downwards (i.e., the light exit window is typically between 180 to 240 degrees) instead of all around the tube (a fluorescent tube lamp has a light exit window of 360 degree by definition), a TLED lamp can provide a significantly higher optical efficiency than a fluorescent tube lamp. Therefore, the power consumption of a TLED lamp will be lower than a corresponding fluorescent tube lamp. For example, to replace a 36 W 4 ft TL lamp, power consumption of a TLED lamp is typically specified at about 20 W. Therefore, power reduction of over 40% needs to be realized by the LED driver.

However, an installed electronic ballast in an existing fluorescent tube lamp lighting fixture is intended to operate a fluorescent lamp. A standard 4 foot T8 fluorescent tube lamp is rated at 32 W power with an electronic ballast and the ballast is designed to drive the TL lamp with the correct current for this power level. In the simplest case, an LED string could be connected to the electronic ballast with the help of a diode bridge for converting the high frequency AC power supplied by the electronic ballast to the DC current for the LED string, with a capacitor for smoothing out the ripple current. If the LED string is chosen substantially close to a burning voltage of the TL lamp, the LED lamp will receive similar power and current compared to the TL lamp.

However, this simple method does not have closed loop power/current control of the TLED lamp. Therefore the amount of light output would be heavily impacted by the different electronic ballast circuit designs, fixture lamp configurations (i.e., single, dual lamp), mains voltage variation, and the spread of the LED forward voltage together with its temperature dependency. It is very difficult for such circuit to achieve LED current tolerance of +/−10%.

That is, one of the challenges of providing a TLED lamp for retrofit into existing fluorescent tube lamp lighting fixtures with electronic ballasts is the provision of an LED lighting driver which can reliably operate with a variety of existing installed electronic ballasts designed for fluorescent tube lamps, and with LEDs having a reasonable variation on forward voltage.

In summary, in order to eliminate labor costs associated with installing new lighting fixtures or rewiring existing lighting fixtures, it would be desirable to retrofit LED tube (TLED) lamps into the existing fluorescent tube lamp lighting fixtures having electronic ballasts, in place of the existing fluorescent tube lamps, while leaving the existing electronic ballasts in place. Additionally, it would be desirable to be able to retrofit the same TLED lamp into different lighting fixtures having a variety of different electronic ballasts with different output levels. Furthermore, it would be desirable to provide a TLED lamp design which can operate with a variety of different electronic ballasts with different output levels over a range of tolerances for the LEDs themselves.

SUMMARY

The present disclosure is directed to inventive methods and apparatus for LED-based tube ("TLED") lamp that can be retrofit into existing lighting fixtures compatibly with a variety of installed electronic ballasts which are designed for fluorescent lamps. For example, in some embodiments a TLED lamp as disclosed herein can be retrofit into existing fluorescent tube lamp lighting fixtures having electronic ballasts in place of the existing fluorescent tube lamps, while leaving the existing electronic ballasts in place, can be retrofit into a wide variety of different lighting fixtures having a variety of different electronic ballasts with different output levels, and can operate with a variety of different electronic ballasts with different output levels over a range of tolerances for the LEDs themselves.

Generally, in one aspect, the invention relates to an apparatus including an light emitting diode tube ("TLED") lamp. The TLED lamp includes a tube having at least one electrical connector configured to be installed in a fluorescent light fixture; a plurality of light emitting diodes (LEDs) arranged in series with each other in a string and disposed inside the tube; and a lighting driver disposed inside the tube and connected to the at least one electrical connector and being configured to supply power to the plurality of LEDs. The lighting driver includes a rectifier having an input connected to receive AC electrical power from the at least one electrical connector and having an output connected to supply power to the plurality of LEDs; a switching device connected to the output of the rectifier and configured to be opened and closed to modulate an LED voltage from the plurality of LEDs that appears across the output of the rectifier; a current sensor configured to sense an LED current passing through the string of LEDs; and a controller configured to control a switching operation of the switching device in response to the sensed LED current. In some embodiments the switching device may be directly connected to the output of the rectifier, and in other embodiments one or more intervening elements may be present between the output of the rectifier and the switching device.

In one embodiment, the controller is configured to execute an algorithm to compare the sensed LED current to a reference value and to control at least one of a duty cycle and a switching rate of a switching control signal provided to the switching device so as to drive the sensed LED current to equal the reference value.

According to one optional feature of this embodiment, the apparatus also includes a second current sensor configured to sense an output current of the rectifier; and a zero crossing detector connected to an output of the second current sensor and configured to determine approximate times when zero crossings occur in an AC input current of the received AC electrical power and to provide a signal to the controller that indicates the approximate times of the zero crossings in the AC input current, wherein the controller is configured to synchronize pulses of the switching control signal with the approximate times of the zero crossings in the AC input current.

In another embodiment, the controller is configured to execute an algorithm to: compare the sensed LED current to a reference value to produce a comparison result; proportionally integrate the comparison result to determine a pulse duration; and modulate a switching control signal provided to the switching device with the pulse duration so as to drive the sensed LED current to equal the reference value.

According to another embodiment, the apparatus also includes a voltage sensor configured to sense the LED voltage, wherein the controller is configured to execute an algorithm to calculate from the sensed LED current and the sensed LED voltage an average LED power supplied to the LEDs, to compare the average LED power to a reference value, and to control at least one of a duty cycle and a switching rate of a switching control signal provided to the switching device so as to drive the average LED power to equal the reference value.

According to yet another embodiment, the apparatus further includes an electronic ballast connected to supply the AC electrical power to the at least one electrical connector.

According to still another embodiment, the apparatus further includes a second switching device connected to the output of the rectifier and configured to be opened and closed to modulate the LED voltage appearing across the output of the rectifier from the plurality of LEDs, wherein the switching device and second switching device are opened together and closed together so as to cause a first subset of the LEDs in the string to be in parallel with a second subset of the LEDs in the string across the output of the rectifier.

According to a further embodiment, the apparatus further includes a switch driver configured to provide a switching control signal to the switching device, wherein the switching control signal has a periodic switching rate and a duty cycle, and wherein the controller controls the duty cycle of the switching control signal so as to cause an average power supplied to the LEDs to equal a reference value.

According to a still further embodiment, the switching device is connected in parallel across a first subset of the LEDs comprising less than all of the LEDs that are in series with each other.

According to yet further embodiment, the LEDs in the string include a first subset of LEDs and a second subset of LEDs, and the apparatus further includes a bridging diode connected in series in between the first subset of LEDs and the second subset of LEDs in the string. The apparatus further includes a second switching device, connected in parallel with a series combination of the first subset of LEDs and the bridging diode, and/or connected in parallel with a series combination of the second subset of LEDs and the bridging diode.

Generally, in another aspect, the invention relates to a method for driving a plurality of light emitting diodes (LEDs). The method includes receiving a supply of AC electrical power from at least one electrical connector; rectifying an AC input voltage of the supplied AC electrical power and supplying an LED current to the LEDs; sensing the LED current; and controlling a switching operation of a switching device in response to the sensed LED current to modulate an amount of power supplied to the plurality of LEDs so as to cause an average of the power supplied to the plurality of LEDs to be equal to a target power level.

Generally, in yet another aspect, the invention relates to a lighting driver that includes: a rectifier having an input connected to receive AC electrical power from an electronic ballast and having an output connected to supply a current to a plurality of light emitting diodes (LEDs) arranged in series with each other in a string; and a switching device disposed at the output of the rectifier and configured to receive a switching control signal and in response thereto to execute a switching operation to modulate an amount of power supplied to the plurality of LEDs so as to cause an average of the power supplied to the plurality of LEDs to be equal to a target power level.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "lamp" should be interpreted to refer to a lighting unit that includes connector(s) for receiving electrical power and for generating radiation (e.g., visible light) from the received electrical power. Examples include bulbs and tubes, including incandescent bulbs, fluorescent bulbs, fluorescent tubes, LED bulbs, LED tube (TLED) lamps, etc.

The term "lighting fixture" is used herein to refer to an implementation or arrangement of one or more lighting units in a particular form factor, assembly, or package, and may be associated with (e.g., include, be coupled to and/or packaged together with) other components, for example an electromagnetic (EM) ballast, in particular for supplying power.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

As used herein "Mains" refers to the general-purpose alternating current (AC) electric power supply from the public utility grid, and may sometimes also be referred to as household power, household electricity, domestic power, wall power, line power, city power, street power, and grid power.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Solutions have been proposed for retrofitting light emitting diode (LED) tube (TLED) lamps into existing fluorescent tube lamp lighting fixtures having electromagnetic (EM) ballasts.

Some examples are described in U.S. Provisional Patent Application 61/443,300, filed on 16 Feb. 2011 in the names of inventors William Jans, et al., which is incorporated herein by reference. However, these solutions are inapplicable for fluorescent tube lamp lighting fixtures having electronic ballasts as described above.

Therefore, the present inventor has recognized and appreciated that it would be beneficial to provide solutions for retrofitting TLED lamps into existing fluorescent tube lamp lighting fixtures having electronic ballasts, in place of the existing fluorescent tube lamps, while leaving the existing electronic ballasts in place. Additionally, it would be desirable to be able to retrofit the same TLED lamp into different lighting fixtures having a variety of different electronic ballasts with different output levels. Furthermore, it would be desirable to provide a TLED lamp design which can operate with a variety of different electronic ballasts with different output levels over a range of tolerances for the LEDs themselves.

Figure 1:
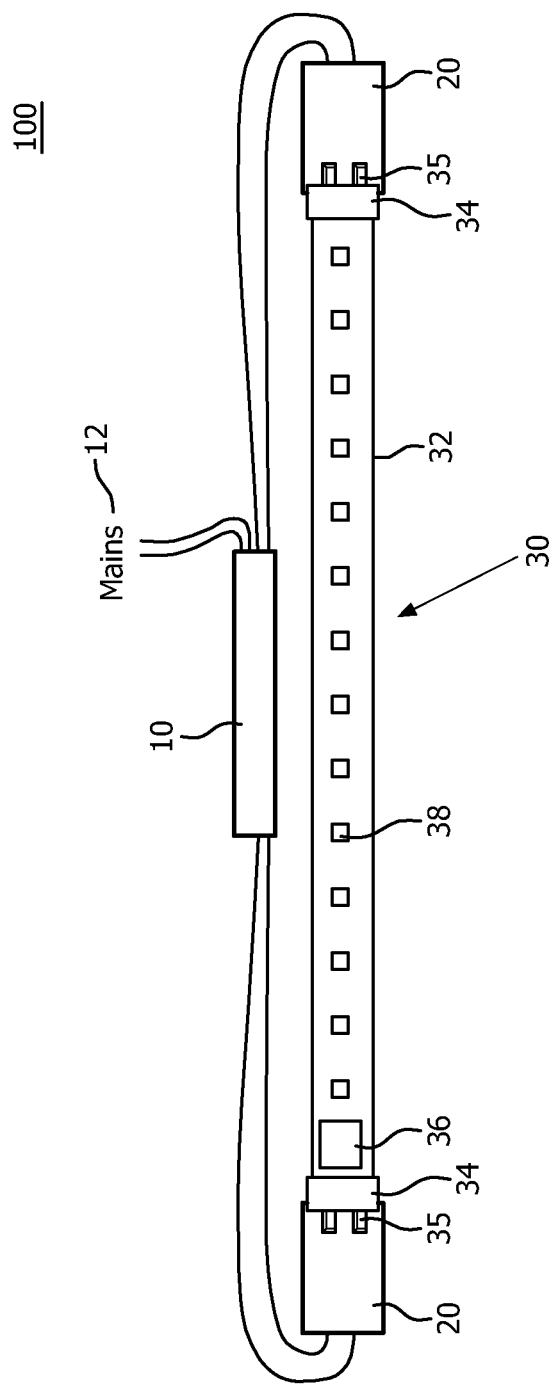
FIG. 1 illustrates an example embodiment of a lighting fixture including a light emitting diode (LED) tube (TLED) lamp installed in place of a fluorescent tube lamp.

In view of the foregoing, various embodiments and implementations of the present invention are directed to a TLED lamp and a lighting driver for a TLED lamp that can be retrofit into existing fluorescent tube lamp lighting fixtures having electronic ballasts FIG. 1 illustrates an example embodiment of a lighting fixture 100 including a light emitting diode (LED) tube (TLED) lamp 30 installed in place of a fluorescent tube lamp. TLED lamp 30 includes a substantially cylindrical shell or tube 32 and two end caps 34 each having a connector 35 provided therewith, and further includes a lighting driver 36 and one or more light emitting diodes (LEDs) 38. In some embodiments, LED lamp 30 may have only one end cap 34 and/or connector 35. Connector(s) 35 of TLED lamp 30 are connected via connector(s) 20 to electronic ballast 10 that supplies TLED lamp 30 with AC input power produced by electronic driver 10 from Mains 12. In particular, lighting driver 36 receives power from electronic ballast 10 via electrical connector(s) 35, and is configured to supply power to the one or more light emitting diodes 38.

In some embodiments, at least a portion of substantially cylindrical shell or tube 32 is metallic, for example aluminum, in which case TLED lamp 30 may be said to have an aluminum tube-based architecture. In other embodiments, substantially cylindrical shell or tube 32 is made of glass (or plastic), in which case TLED lamp 30 may be said to have a glass (or plastic) tube-based architecture.

Figure 2:
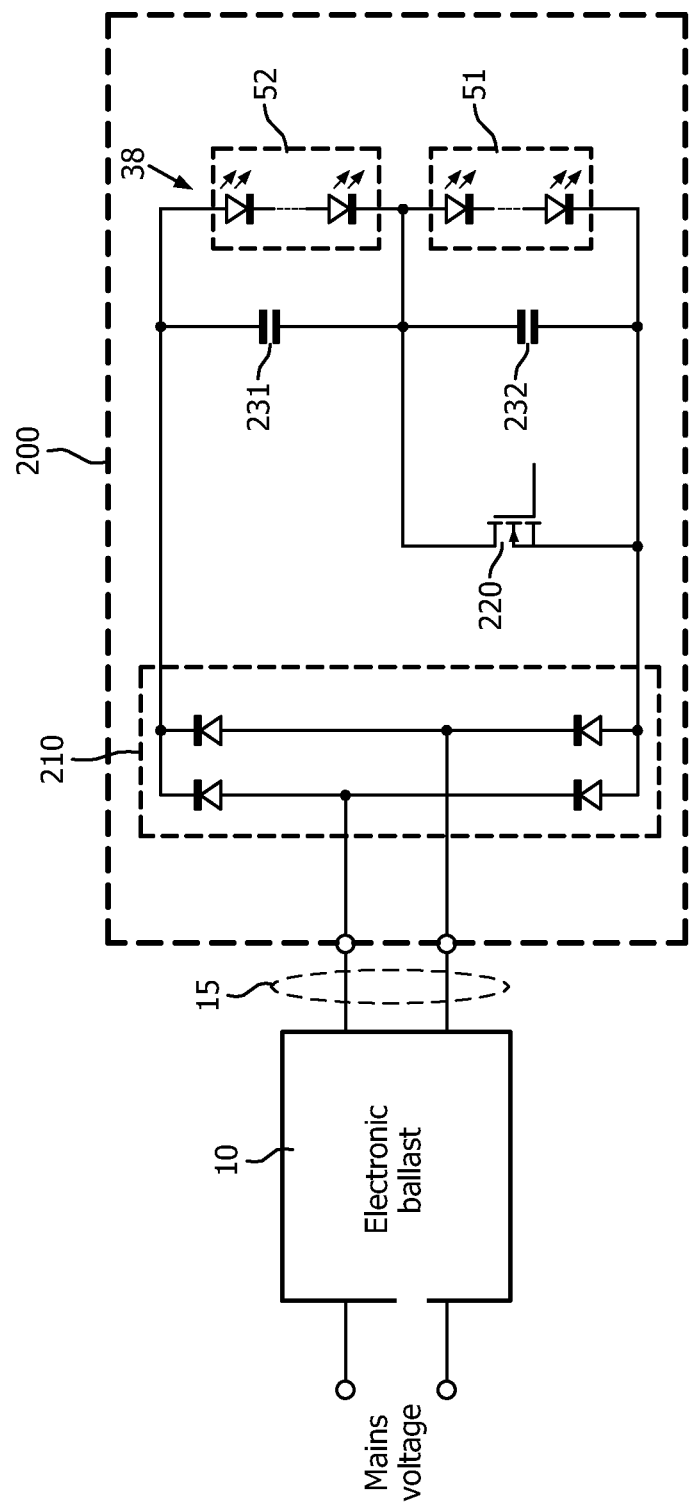
FIG. 2 is a partial block diagram illustrating components of one example embodiment of a TLED lamp supplied with power from an electronic ballast.

FIG. 2 is a partial block diagram illustrating components of one example embodiment of a TLED lamp 200 supplied with AC input power 15 from electronic ballast 10. TLED lamp 200 includes a rectifier 210, a switching device 220, capacitors 231 and 232, and a plurality of LEDs 38.

Rectifier 210 has an input for receiving the AC input power 15 (for example, via a connector such as 35 as shown in FIG. 1) and an output connected to supply power to the plurality of LEDs 38.

LEDS 38 are connected in series with other in a string across the output of rectifier 210. LEDs 38 are divided into a first subset 51, and a second subset 52, as discussed in more detail below.

Capacitors 231 and 232, connected across first and second subsets 51 and 52 of LEDs 38, respectively, smooth out ripple current output by rectifier 210.

Switching device 220 is connected to the output of rectifier 210 in parallel with capacitor 232 and the first group 51 of LEDs 38. In the illustrated example, switching device 220 is a field effect transistor (FET), but other appropriate switching devices may be employed instead.

In operation, rectifier 210 receives AC input power 15 from electronic ballast 10. AC input power 15 has a corresponding AC input voltage and AC input current. In a typical embodiment, the AC input voltage and the AC input current have a frequency which is much greater than the line frequency of the AC Mains which supplies power to electronic ballast 10. In a typical embodiment, the frequency of the AC input voltage and AC input current from supplied to TLED 200 from electronic ballast 10 has a value of between 10 kHz and 70 kHz (e.g., 40 kHz). Furthermore, electronic ballast 10 is designed to supply a certain power level to a fluorescent tube with which it is intended to be operated, for example 32 watts. More specifically, electronic ballast 10 is designed to output an AC output current that is consistent with the current requirements of a fluorescent tube having a certain power rating (e.g., 32 Watts).

On the other hand, in a typical embodiment the power requirement of TLED lamp 200 is significantly lower than the designed output power level of electronic ballast 10. For example, in one embodiment where electronic ballast is designed to supply 32 watts, TLED lamp 200 may only require 20 watts.

In a beneficial feature, switching device 220 of TLED lamp may be controlled to regulate the power supplied to LEDs 38 from electronic ballast 10, as will be described below.

Switching device 220 receives a switching control signal that controls the switching device 220 to be selectively turned ON and OFF.

When switching device 220 is turned OFF, then switching device 220 has a high impedance and very little current (e.g., approximately none) passes therethrough, and LED current from rectifier 210 passes through the LEDs 38 of the first subset 51. In that case, the voltage across switching device 220 is equal to the sum of the individual voltages of the LEDs 38 of the first subset 51. As a result, when switching device 220 is turned OFF the LED voltage across the output of rectifier 210 is equal to the sum of the individual voltages of all of the LEDs 38 in the string.

When switching device 220 is turned ON, then switching device 220 provides a current bypass path across the first group 51 of LEDs 38 and very little current (e.g., approximately none) passes through the LEDs 38 of the first subset 51. In that case, the voltage across switching device 220 is equal to the "ON" voltage of switching device 220, which is very low (e.g., approaching zero) compared to the sum of the LED voltages of the LEDs 38 of the first subset 51 when switching device 220 is OFF. As a result, when switching device 220 is turned ON the LED voltage across the output of rectifier 210 is only equal to the sum of the individual voltages of all of the LEDs 38 in the second subset 52.

Because, switching device 220 shunts or bypasses part of the LED string, it provides a means for lamp power control by varying or modulating the voltage seen by electronic ballast 10. If the switching control signal is controlled to repeatedly (e.g., periodically) turn ON and OFF switching device 220, then switching device 220 modulates the LED voltage from the plurality of LEDs 38 in the string that appears across the output of rectifier 210. It is further noted that in this case, switching device 220 also periodically prevents the LED current from being provided to the first subset 51 of LEDs 38, including at least a first one of the LEDs 38, for a portion of each of a plurality of time periods. However, switching device 220 does not prevent the LED current being provided to the second subset 52 of LEDs 38, including at least a second one of the LEDs 38, whether it is turned ON or OFF.

Figure 3:
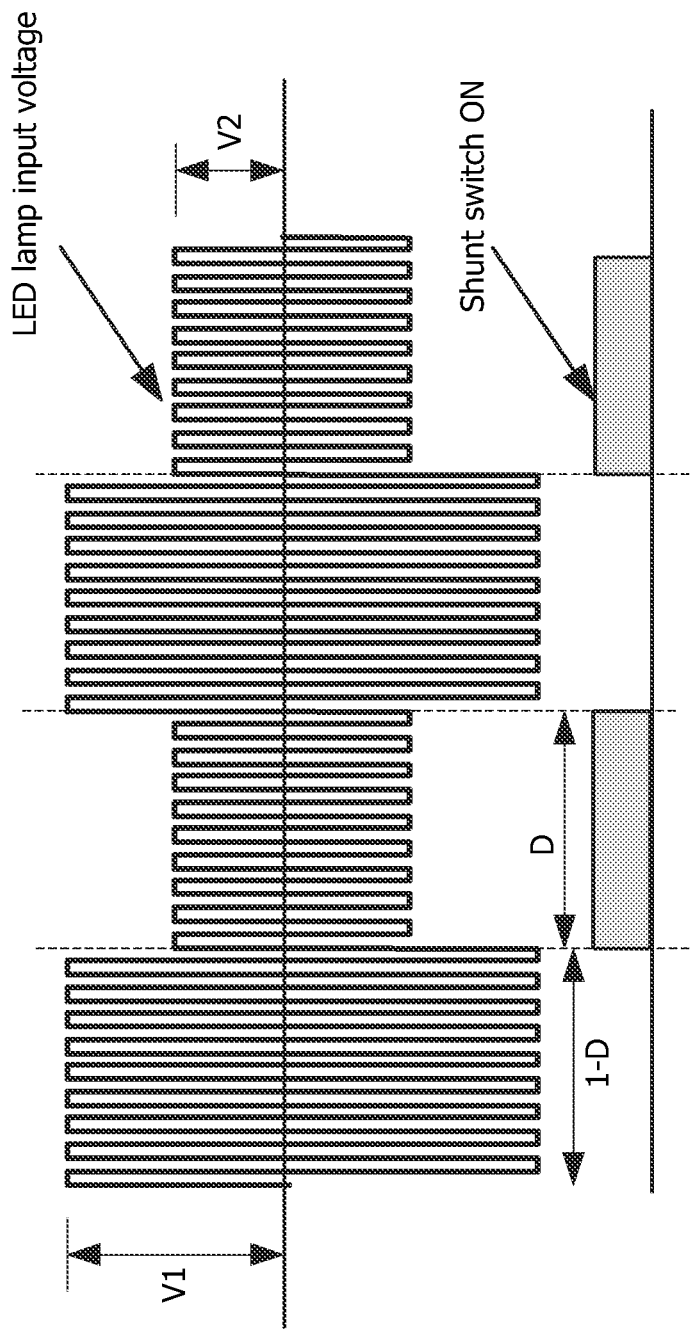
FIG. 3 illustrates how the AC input voltage supplied to a TLED lamp may be varied by controlling a number of LEDs that receive power during a plurality of time intervals.

FIG. 3 illustrates how the AC input voltage supplied to TLED lamp 200 by electronic ballast 10 may be varied or modulated by controlling a number of LEDs 38 that receive power from the output of rectifier 210 during a plurality of time intervals.

In particular, when switching device 220 is switched OFF, then electronic ballast 10 is loaded with a LED string having a total voltage V1 (i.e., the sum of the LED voltages of the entire string of LEDs 38), whereas when switching device 220 is switched ON, electronic ballast 10 is loaded with a string of voltage V2 (i.e., the sum of the LED voltages of only the second subset 52 of LEDs 38 in the string).

Switching device 220 shunts part of the LED string for several cycles of AC input power 15, presenting only part of the LED string voltage, V2, via rectifier 210 to electronic ballast 10, and sequentially switching device 220 is turned off for the next several cycles of AC input power 15, presenting the whole LED string voltage, V1, via rectifier 210 to electronic ballast 10, where:

$$V2 = k*V1 \ (0<k<1). \quad (1)$$

Therefore, by varying the duty cycle, D, of the switching operation of switching device 220, the equivalent voltage (averaged over a long time period), $V_{EQU}$, seen by electronic ballast 10 is:

$$V_{EQU} = V1*(1-D) + V2*D. \quad (2)$$

Since electronic ballast 10 delivers two different powers to the TLED lamp depending on the LED voltage appearing across the output of the rectifier, The average LED power, $P_{LED}$, supplied to the string of LEDs 38 is mainly determined by the duty cycle D, that is:

$$P_{LED} = P1*(1-D) + P2*D. \quad (3)$$

Where P1 is the power supplied to the LEDs when the switch is OFF and P2 is the power supplied to the LEDs when the switch is ON.

Therefore by controlling the duty cycle D of the switching operation of switching device 220, the LED current $I_{LED}$ and the average LED power $P_{LED}$ can be regulated. In one embodiment, the duty cycle D may be controlled or regulated to cause the average LED power $P_{LED}$ to equal a target power level.

In one embodiment, the switching frequency or rate of switching device 220 can be fixed at a certain frequency fs. In some example embodiments, fs can have a value between 100 Hz to 20 kHz, being less than the typical operating frequency of electronic ballast 10 (about 40 kHz). In another embodiment, the switching frequency of switching device 220 can be made variable in order to, for example, reduce electromagnetic interference (EMI) generated by TLED lamp 200.

Figure 4:
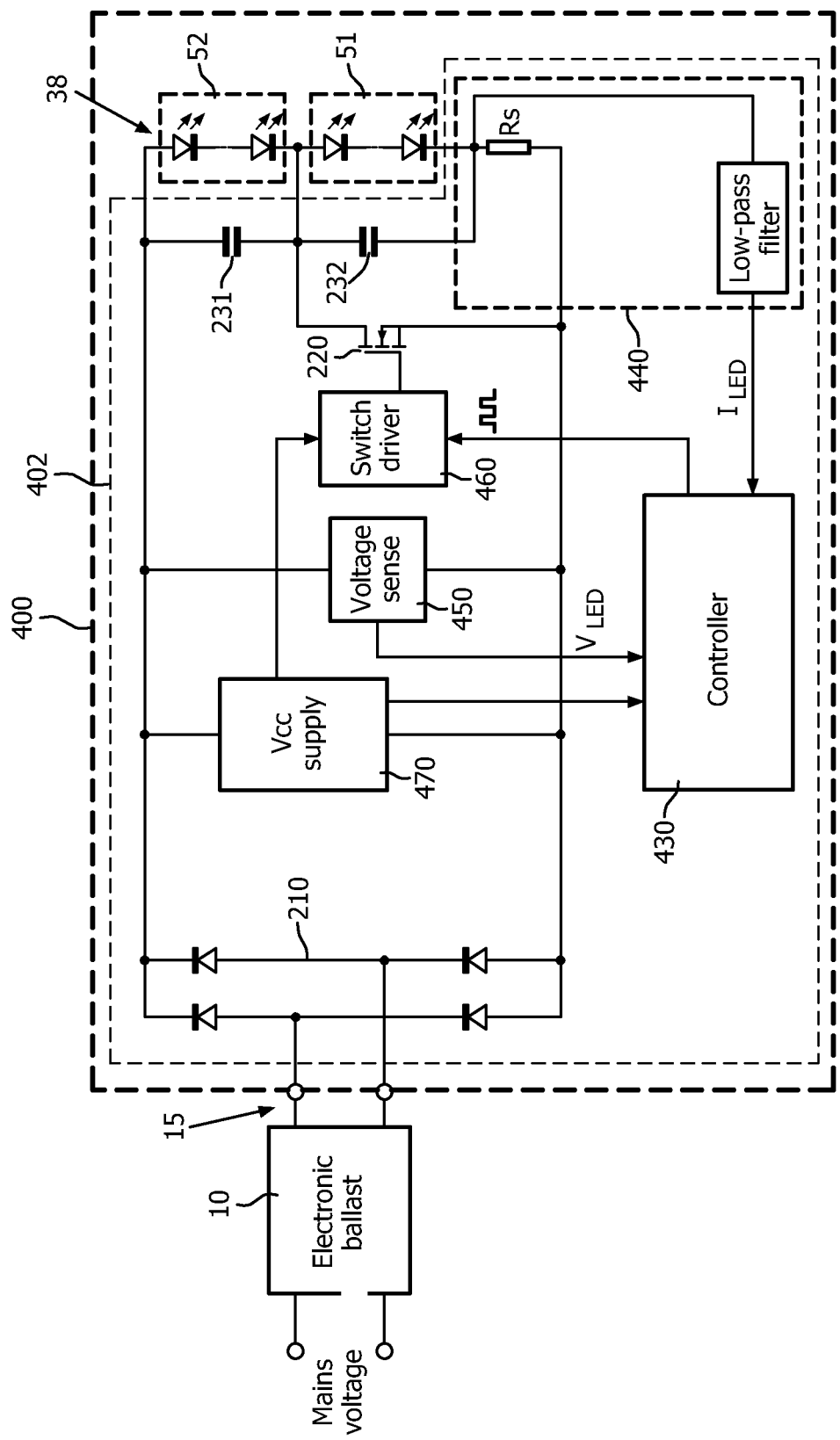
FIG. 4 is a detailed diagram illustrating one example embodiment of a TLED lamp supplied with power from an electronic ballast.

FIG. 4 is a detailed diagram illustrating one example embodiment of a TLED lamp 400 supplied with power from electronic ballast 10.

TLED lamp 400 includes an LED driver 402 and a plurality of LEDs 38.

LED driver 402 includes rectifier 210, switching device 220, capacitors 231 and 232 controller 430, current sensor 440, voltage sensor 450, a switch driver 460, and a controller voltage supply 470.

Rectifier 210 has an input for receiving the AC input power 15 (for example, via a connector such as 35 as shown in FIG. 1) and an output connected to supply power to the plurality of LEDs 38.

LEDs 38 are connected in series with other in a string across the output of rectifier 210. LEDs 38 are divided into a first subset 51, and a second subset 52, as discussed above.

Switching device 220 is connected to the output of rectifier 210 in parallel with capacitor 232 and the first group 51 of LEDs 38. In the illustrated example, switching device 220 is a field effect transistor (FET), but other appropriate switching devices may be employed instead.

In operation, current sensor 440 senses an LED current $I_{LED}$ through sensing resistor Rs and a low pass filter, and provides a signal indicating the sensed LED current $I_{LED}$ to controller 430.

In response to the sensed LED current $I_{LED}$, controller 430 controls switch driver 460 to provide a switching control signal to switching device 220 that controls switching device 220 to be selectively turned ON and OFF, as described above with respect to FIGS. 2 and 3.

In one embodiment, controller 430 is configured to execute an algorithm to compare the sensed LED current $I_{LED}$ to a reference value $I_{REF}$ and to control the duty cycle D of the switching control signal provided to switching device 220 so as to drive the sensed LED current $I_{LED}$ to equal the reference value $I_{REF}$.

Figure 5A:
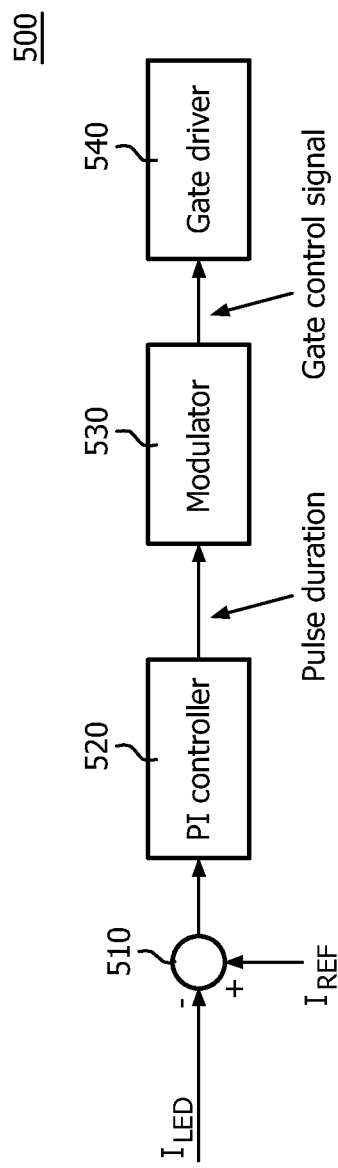
FIG. 5A shows one embodiment of a control loop which may be employed to control a power supplied by an LED driver to a plurality of LEDs.

FIG. 5A shows one embodiment of a control loop 500 which may be employed to control a power supplied by an LED driver to a plurality of LEDs based on a sensed LED current, as described above.

Control loop 500 includes a comparator 510, a proportional integral (PI) controller 520, a modulator 530, and a gate driver 540 (which may be switch driver 460 in FIG. 4).

In particular, control loop 500 may be embodied by controller 430, which may include a processor, perhaps together with some peripheral circuitry, and programming instructions for configuring the processor to execute a control algorithm. In one embodiment, the algorithm may comprise: comparing the sensed LED current $I_{LED}$ to a reference value $I_{REF}$ to produce a comparison result; proportionally integrating the comparison result to determine a pulse duration; and modulating the switching control signal provided to switching device 220 with the pulse duration so as to drive the sensed LED current $I_{LED}$ to equal the reference value $I_{REF}$. In some embodiments, $I_{REF}$ may be selected to match a nominal or designed output current level of electronic ballast 10 of a lighting fixture into which TLED 400 is to be installed.

In the embodiment described above, voltage sensor 450 may be omitted from TLED 400 and TLED driver 402.

In another embodiment, controller 430 is configured to execute an algorithm to calculate from the sensed LED current and the sensed LED voltage an average power $P_{LED}$ supplied to the LEDs, to compare the average LED power $P_{LED}$ to a reference value $P_{REF}$, and to control the duty cycle D of the switching control signal provided to switching device 220 so as to drive the average LED power $P_{LED}$ supplied to the LEDs to equal the reference value $P_{REF}$.

Figure 5B:
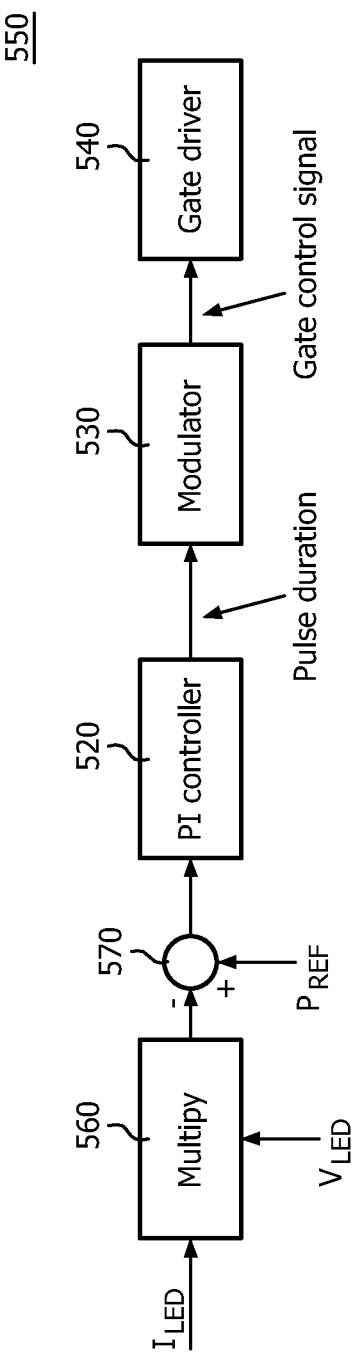
FIG. 5B shows another embodiment of a control loop which may be employed to control a power supplied by an LED driver to a plurality of LEDs.

FIG. 5B shows another embodiment of a control loop 550 which may be employed to control a power supplied by an LED driver to a plurality of LEDs based on a sensed LED current and a sensed LED voltage, as described above.

Control loop 550 includes a multiplier 560, comparator 510, proportional integral (PI) controller 520, modulator 530, and gate driver 540.

In particular, control loop 550 may be embodied by controller 430, which may include a processor, perhaps together with some peripheral circuitry, and programming instructions for configuring the processor to execute a control algorithm. In one embodiment, the algorithm may comprise: determining the power $P_{LED}$ supplied to the LEDs based on the sensed LED current $I_{LED}$ and the sensed LED voltage $V_{LED}$ (e.g. by multiplying $I_{LED}$ and $V_{LED}$ together); compare the determined LED power $P_{LED}$ to a reference value $P_{REF}$ to produce a comparison result; proportionally integrate the comparison result to determine a pulse duration; and modulate the switching control signal provided to switching device 220 with the pulse duration so as to drive the determined LED power $P_{LED}$ to equal the reference value $P_{REF}$. In some embodiments, $P_{REF}$ may be selected to match a nominal or designed output power level of electronic ballast 10 of a lighting fixture into which TLED 400 is to be installed. In some embodiments, $P_{REF}$ may be selected to be less than the nominal or designed output power level of electronic ballast 10 of a lighting fixture into which TLED 400 is to be installed.

The control algorithms described above employ a switching control signal with a fixed switching frequency, fs, and controller 430 varies the duration of a pulse (e.g., an ON pulse) within each period of the switching control signal to achieve a desired LED current $I_{LED}$ and/or average LED power $P_{LED}$. However, in other embodiments the pulse duration may remain constant, and controller 430 may vary the interval between the pulses, thereby varying the frequency Fs of the switching control signal, to achieve the desired LED current $I_{LED}$ and/or average LED power $P_{LED}$.

Figure 6:
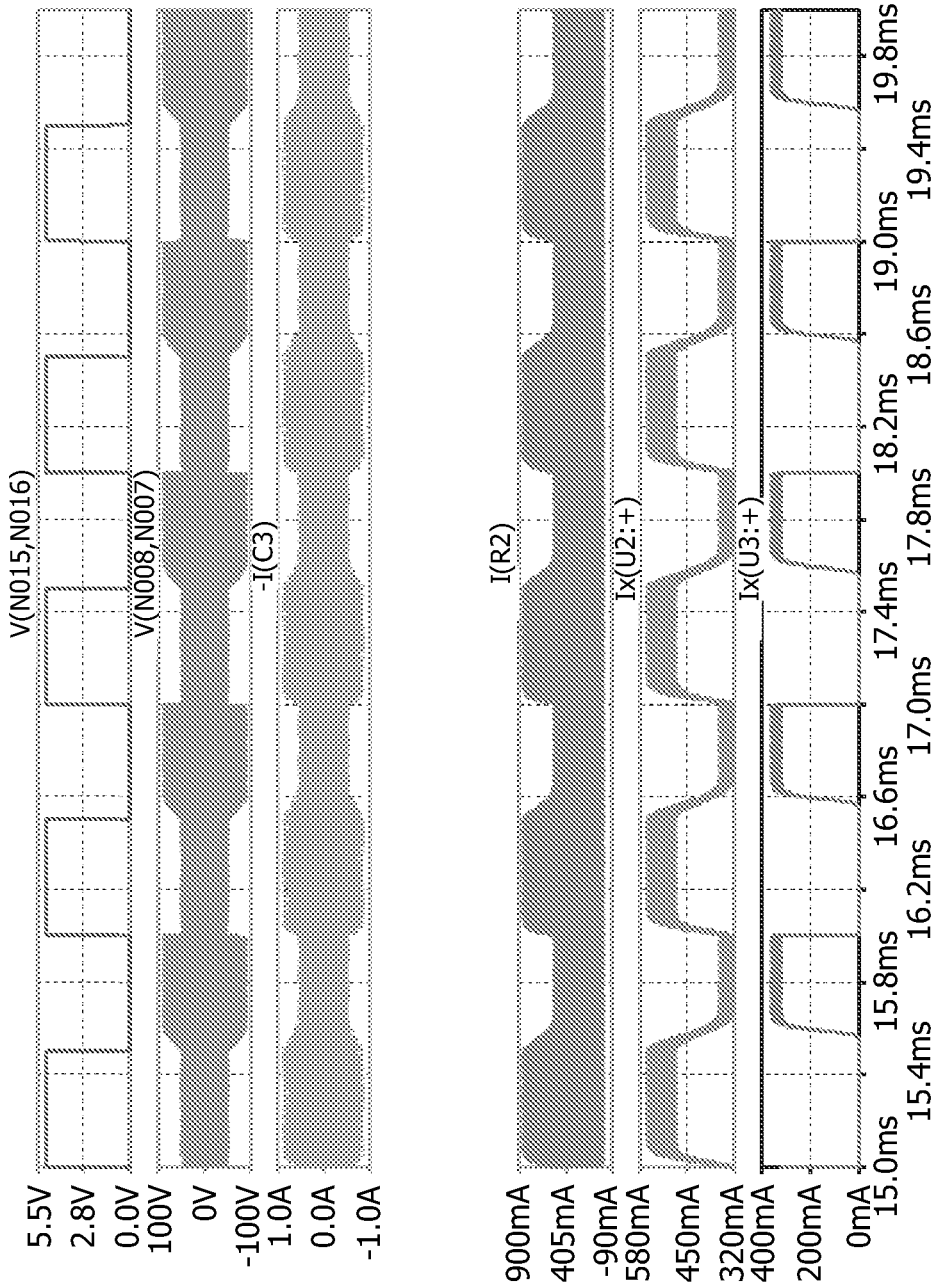
FIG. 6 plots simulated voltage and current waveforms for the TLED lamp of FIG. 4.

FIG. 6 plots simulated voltage and current waveforms for an example embodiment of TLED lamp 400.

From top to bottom, FIG. 6 plots, as a function of time: (1) the switching control signal, (2) AC input voltage, (3) AC input current, (4) the output current of rectifier 210, (5) the current through the second subset 52 of LEDs 38, and (6) the current through the first subset 51 of LEDs 38.

Figure 7:
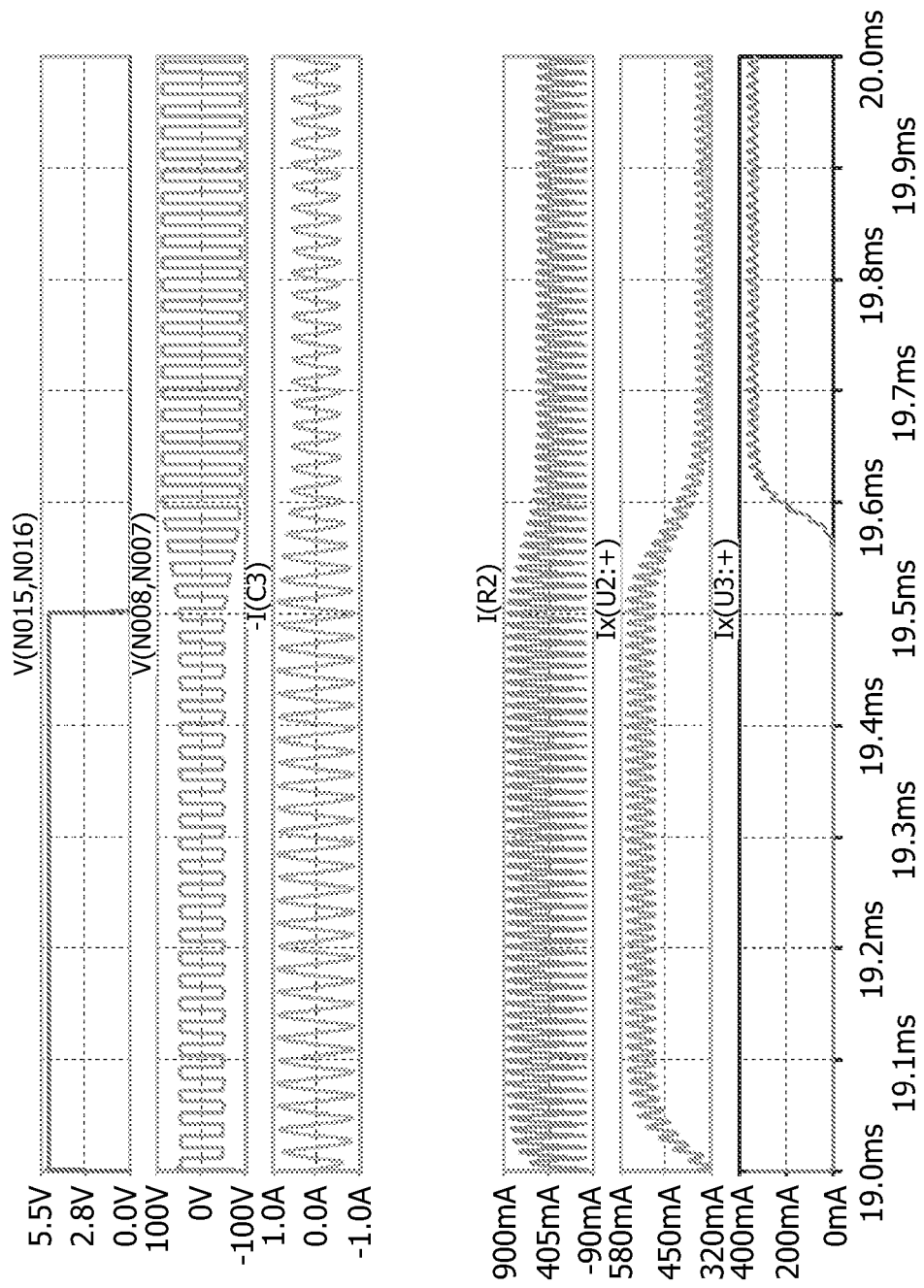
FIG. 7 plots the simulated voltage and current waveforms of FIG. 6 at a greater time resolution.

FIG. 7 plots the simulated voltage and current waveforms of FIG. 6 at a greater time resolution.

Figure 8:
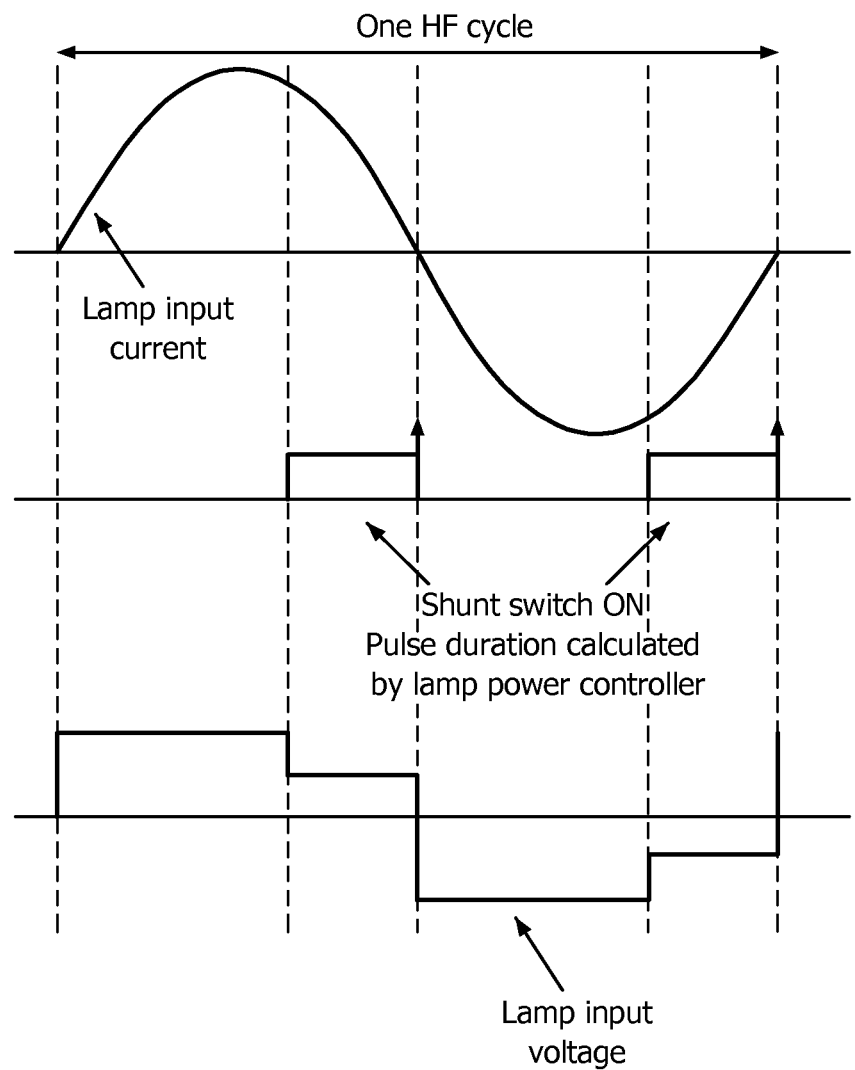
FIG. 8 illustrates one embodiment of a method of regulating the power supplied to LEDs in a TLED lamp.

FIG. 8 illustrates one embodiment of a method of regulating the power supplied to LEDs in a TLED lamp. The method illustrated in FIG. 8 is a variation of the method described above with respect to FIGS. 2-7. In the method illustrated in FIG. 8, the switching device is synchronized to the lamp input current from electronic ballast 10. In particular, the timing of zero crossings of the lamp input current are detected for synchronization. Beneficially, the switching operation of the switching device is preferably aligned with the zero crossings, as shown in FIG. 8. In one embodiment, the switching frequency fs is actually twice the operating frequency of electronic ballast 10 (e.g., a typical switching frequency of electronic ballast 10 is at about 30 to 70 kHz).

To implement the synchronization illustrated in FIG. 8, a zero crossing detection may be added to the LED driver.

Figure 9:
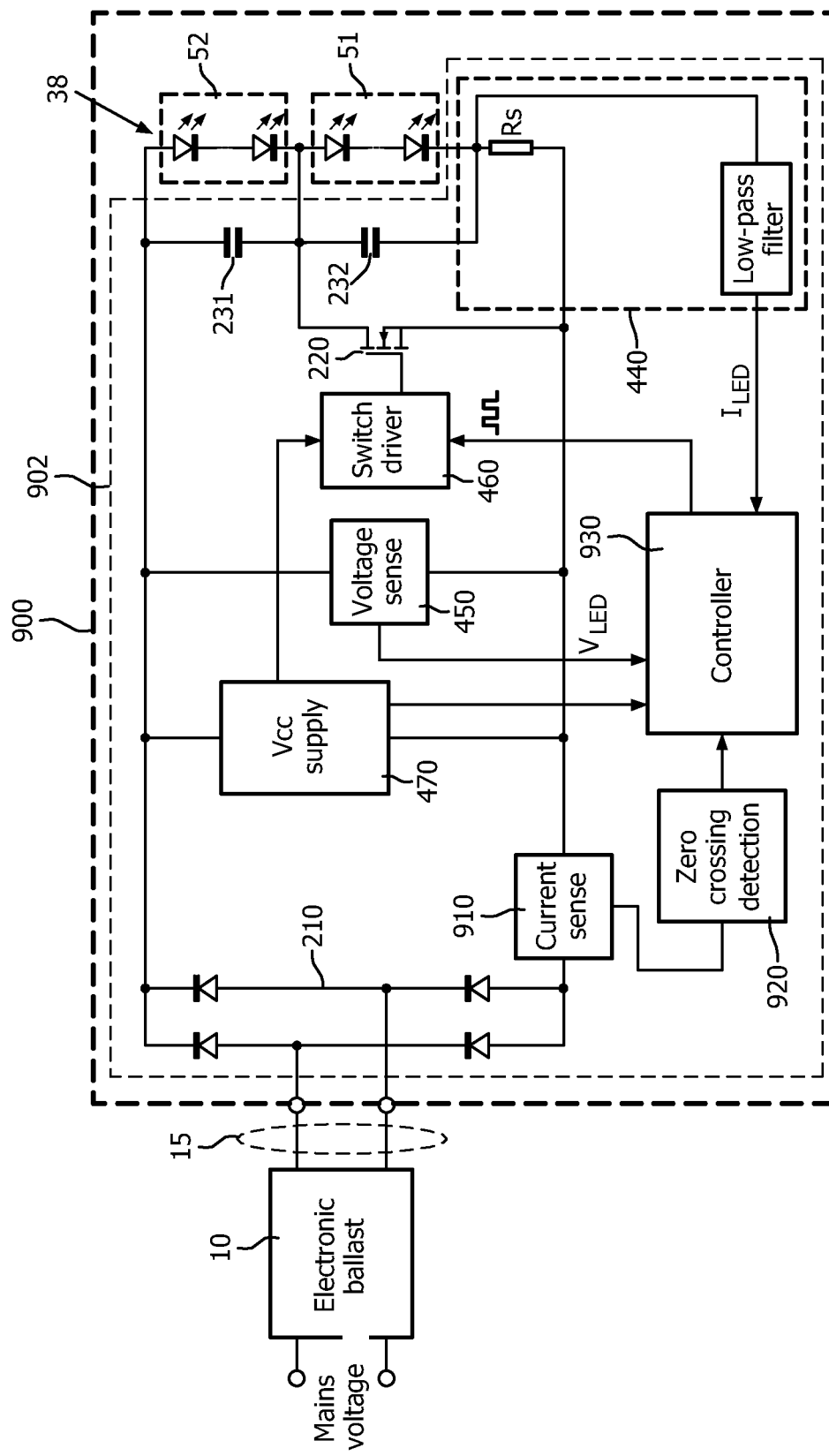
FIG. 9 is a detailed diagram illustrating another example embodiment of a TLED lamp supplied with power from an electronic ballast.

FIG. 9 is a detailed diagram illustrating another example embodiment of a TLED lamp 900 supplied with AC input power from electronic ballast 10. TLED lamp 900 includes LED driver 902 and a plurality of LEDs 38. As before, LEDS 38 are connected in series with other in a string coupled to the output of rectifier 210. LEDs 38 are divided into a first subset 51, and a second subset 52, as discussed above.

LED driver 902 is similar in construction and operation to LED driver 402, and so for brevity only differences between them will be described here. In particular, in contrast to LED driver 402, LED driver 902 includes a second current sensor 910 and a zero crossing detector 920 which supply an input to controller 930.

In operation, second current sensor is configured to sense an output current of rectifier 210. Zero crossing detector 920 is connected to an output of second current sensor 910 and is configured to determine approximate times when zero crossings occur in the AC input current from electronic ballast 10, and to provide a signal to controller 930 that indicates the approximate times of the zero crossings in the AC input current. Controller 930 is configured to synchronize pulses of the switching control signal provided to switching device 220 with the approximate times of the zero crossings in the AC input current.

Figure 10A:
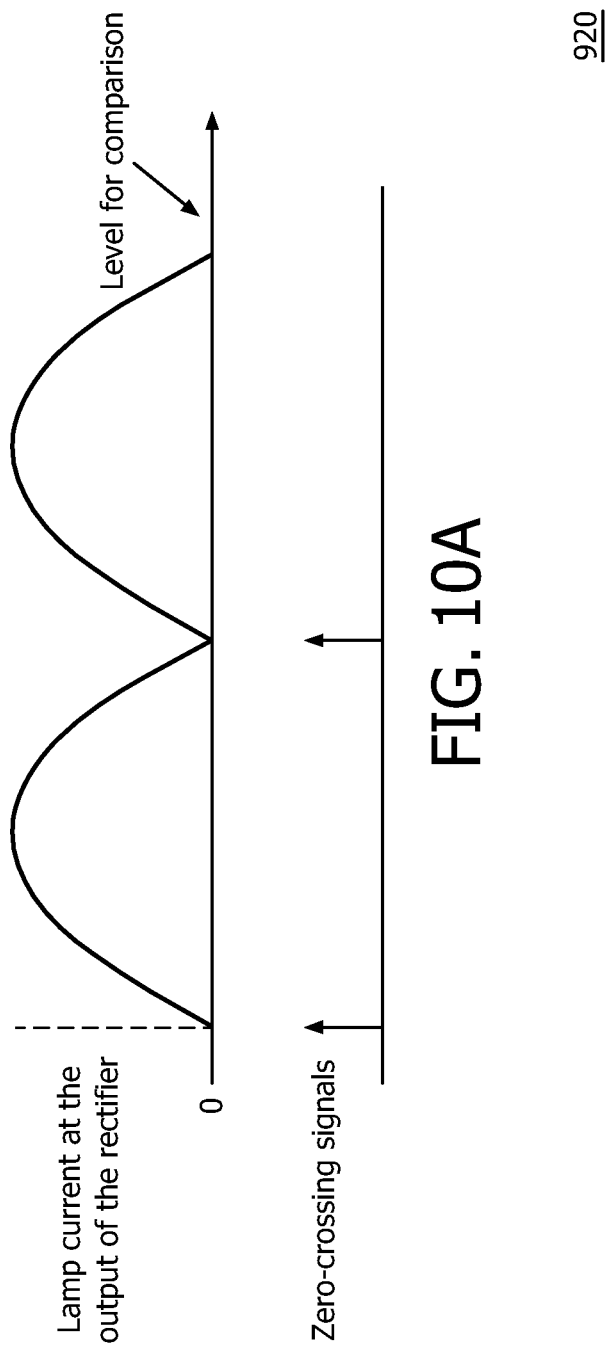
FIG. 10A illustrates an operation of one embodiment of a current detector and a zero crossing detector.

FIG. 10A illustrates an operation of one embodiment of a current detector and zero crossing detector. As illustrated in FIG. 10A, the lamp current at the output of rectifier 210 is a rectified version of the AC input current from electronic ballast 10. So when the AC input current goes negative, the lamp current at the output of rectifier 210 remains positive, and therefore technically never crosses zero. However, zero crossings in the AC input current manifest themselves as zero values in the lamp current at the output of rectifier 210, which can be detected with a threshold detector.

Figure 10B:
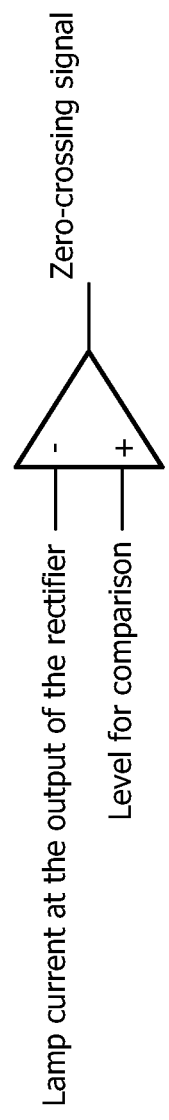
FIG. 10B illustrates one example embodiment of a zero crossing detector.

FIG. 10B illustrates one example embodiment of a zero crossing detector. Here, a comparator compares the detected lamp current at the output of rectifier 210 with a very low threshold voltage just above zero volts to generate short output pulses which indicate the approximate times of the zero crossings in the AC input current, as indicated above.

Figure 11:
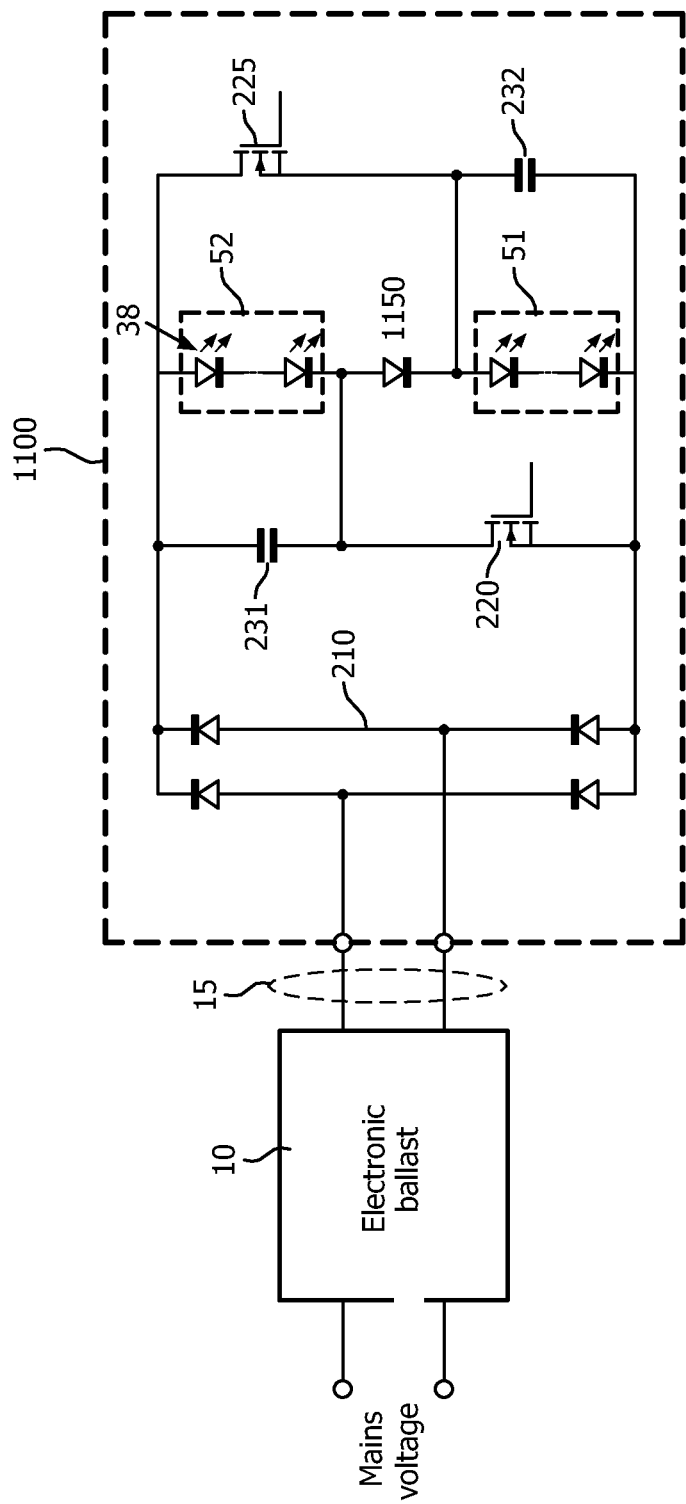
FIG. 11 is a partial block diagram illustrating components of another example embodiment of a TLED lamp supplied with power from an electronic ballast.

FIG. 11 is a partial block diagram illustrating components of another example embodiment of a TLED lamp 1100 supplied with power from electronic ballast 10.

TLED lamp 1100 is similar in construction and operation to TLED lamp 200, and so for brevity only differences between them will be described here. In particular, in contrast to TLED lamp 200, TLED lamp 1100 includes a second switching device 225. Also, the string of LEDs 38 includes the first subset 51 of LEDs 38 connected in series with the second subset 52 of 38 by a bridging diode 1150.

In one embodiment, the two switching devices 220 and 225 are used to configure the first subset 51 of LEDs 38 in the string, and the second subset 52 of LEDs 38 in the string, to be either in series with each other, or in parallel with each other across the output of rectifier 210. In a beneficial arrangement, switching devices 220 and 225 are switched ON and OFF at the same time. When switching devices 220 and 225 are both ON (closed), then the first subset 51 of LEDs 38 and the second subset 52 of LEDs 38 are connected to appear in parallel with each other across the output of rectifier 210. On the other hand, when switching devices 220 and 225 are both OFF (open), then the first subset 51 of LEDs 38 and the second subset 52 of LEDs 38 are connected to appear in series with each other across the output of rectifier 210. Bridging diode 1150 connects one end of the first subset 51 of LEDs 38 to one end of the second subset 52 of LEDs 38 so as to prevent short-circuiting of the entire string of LEDs 38 across the output of rectifier 210 when switching devices 220 and 225 are both ON (closed).

Figure 12:
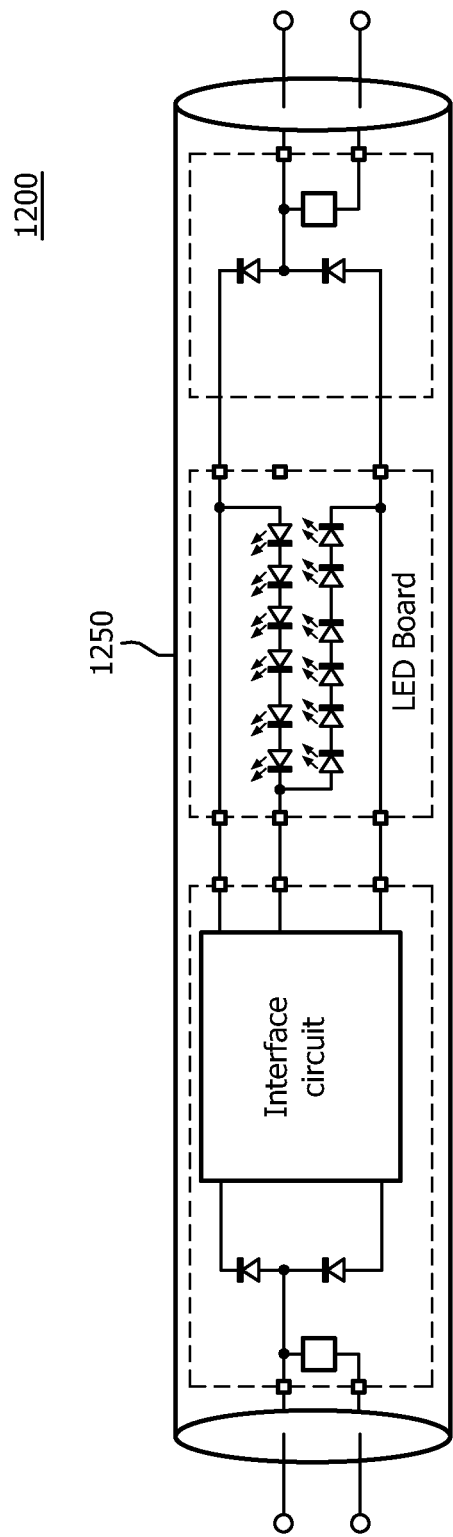
FIG. 12 illustrates one example embodiment of a TLED lamp that may be installed in the lighting fixture of FIG. 1.

FIG. 12 illustrates one example embodiment of a TLED lamp 1200 that may be installed in the lighting fixture of FIG. 1.

FIG. 12 shows how an example of a layout of different parts in TLED lamp 1200. Because power come from both side of the tube, the rectifier is divided into two halves, placed at each side. An interface circuit comprising the switching device, controller, and other parts of the LED driver except for the rectifier, is located at one side of the tube. At each side of the tube, an impedance element (resistor, inductor, etc), shown as a block in the figure, is provided to emulate the filament of a traditional fluorescent tube. Beneficially, the LEDs of the two parts or subsets of the string are equally distributed across the tube on a printed circuit board 1250. This can improve light uniformity because of different driving currents in the two subsets of the LED string with the embodiments of FIG. 4 and FIG. 9.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods claimed herein that include more than one step or act, the order of the steps or acts of the method is not necessarily limited to the order in which the steps or acts of the method are recited.

Reference numerals, if any, appearing in the claims in parentheses are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus comprising a light emitting diode tube (TLED) lamp, the TLED lamp comprising:
a tube having at least one electrical connector configured to be installed in a fluorescent light fixture;
a plurality of light emitting diodes (LEDs) arranged in series with each other in a string and disposed inside the tube; and
a lighting driver disposed inside the tube and connected to the at least one electrical connector and being configured to supply power to the plurality of LEDs, the lighting driver comprising:
a rectifier having an input connected to receive AC electrical power from the at least one electrical connector and having an output connected to supply power to the plurality of LEDs;
a switching device connected to the output of the rectifier and configured to be opened and closed to modulate an LED voltage from the plurality of LEDs that appears across the output of the rectifier;
a current sensor configured to sense an LED current passing through the string of LEDs; and
a controller configured to control a switching operation of the switching device in response to the sensed LED current.

2. The apparatus of claim 1, wherein the controller is configured to execute an algorithm to compare the sensed LED current to a reference value and to control at least one of a duty cycle and a switching rate of a switching control signal provided to the switching device so as to drive the sensed LED current to equal the reference value.

3. The apparatus of claim 2, further comprising:
a second current sensor configured to sense an output current of the rectifier; and
a zero crossing detector connected to an output of the second current sensor and configured to determine approximate times when zero crossings occur in an AC input current of the received AC electrical power and to provide a signal to the controller that indicates the approximate times of the zero crossings in the AC input current,
wherein the controller is configured to synchronize pulses of the switching control signal with the approximate times of the zero crossings in the AC input current.

4. The apparatus of claim 1, wherein the controller is configured to execute an algorithm to:
compare the sensed LED current to a reference value to produce a comparison result;
proportionally integrate the comparison result to determine a pulse duration; and
modulate a switching control signal provided to the switching device with the pulse duration so as to drive the sensed LED current to equal the reference value.

5. The apparatus of claim 1, further comprising a voltage sensor configured to sense the LED voltage, wherein the controller is configured to execute an algorithm to calculate from the sensed LED current and the sensed LED voltage an average LED power supplied to the LEDs, to compare the average LED power to a reference value, and to control at least one of a duty cycle and a switching rate of a switching control signal provided to the switching device so as to drive the average LED power to equal the reference value.

6. The apparatus of claim 5, further comprising:
a second current sensor configured to sense an output current of the rectifier; and
a zero crossing detector connected to an output of the second current sensor and configured to determine approximate times when zero crossings occur in an AC input current of the received AC electrical power and to provide a signal to the controller that indicates the approximate times of the zero crossings in the AC input current,
wherein the controller is configured to synchronize pulses of the switching control signal with the approximate times of the zero crossings in the AC input current.

7. The apparatus of claim 1, further comprising a voltage sensor configured to sense an LED voltage across the LEDs, wherein the controller is configured to execute an algorithm to:
determine an LED power supplied to the LEDs based on the sensed LED current and the sensed LED voltage;
compare the determined LED power to a reference value to produce a comparison result;
proportionally integrate the comparison result to determine a pulse duration; and
modulate a switching control signal provided to the switching device with the pulse duration so as to drive the sensed LED current to equal the reference value.

8. The apparatus of claim 1, further comprising an electronic ballast connected to supply the AC electrical power to the at least one electrical connector.

9. The apparatus of claim 1, further comprising a second switching device connected to the output of the rectifier and configured to be opened and closed to modulate the LED voltage appearing across the output of the rectifier from the plurality of LEDs, wherein the switching device and second switching device are opened together and closed together so as to cause a first subset of the LEDs in the string to be in parallel with a second subset of the LEDs in the string across the output of the rectifier when both switches are closed and to cause a first subset of the LEDs in the string to be in series with a second subset of the LEDs in the string across the output of the rectifier when both switches are opened.

10. The apparatus of claim 1, further comprising a switch driver configured to provide a switching control signal to the switching device, wherein the switching control signal has a periodic switching rate and a duty cycle, and wherein the controller controls the duty cycle of the switching control signal so as to cause an average power supplied to the LEDs to equal a reference value.

11. The apparatus of claim 1, wherein the switching device is connected in parallel across a first subset of the LEDs comprising less than all of the LEDs that are in series with each other.

12. The apparatus of claim 1, wherein the LEDs in the string include a first subset of LEDs and a second subset of LEDs, wherein the apparatus further includes a bridging diode connected in series in between the first subset of LEDs and the second subset of LEDs in the string, and wherein the apparatus further comprises a second switching device, wherein the switching device is connected in parallel with a series combination of the first subset of LEDs and the bridging diode, and wherein the second switching device is connected in parallel with a series combination of the second subset of LEDs and the bridging diode.

13. A method of driving a plurality of light emitting diodes (LEDs), the method comprising:
receiving a supply of AC electrical power from at least one electrical connector;

rectifying an AC input voltage of the supplied AC electrical power and supplying an LED current to the LEDs;

sensing the LED current; and controlling a switching operation of a switching device in response to the sensed LED current to modulate an amount of power supplied to the plurality of LEDs by switching between at least a first non-zero power level and a second non-zero power level so as to cause an average of the power supplied to the plurality of LEDs to be equal to a target power level.

14. The method of claim 13, further comprising comparing the sensed LED current to a reference value, and controlling at least one of a duty cycle and a switching rate of the switching operation so as to drive the sensed LED current to equal a reference value.

15. The method of claim 13, further comprising determining approximate times when zero crossings occur in an AC input current of the AC electrical power, and synchronizing the switching operation with the approximate times of the zero crossings in the AC input current.

16. A device, comprising:

a rectifier having an input connected to receive AC electrical power from an electronic ballast and having an output connected to supply a current to a plurality of light emitting diodes (LEDs) arranged in series with each other in a string; and a switching device disposed at the output of the rectifier and configured to receive a switching control signal and in response thereto to execute a switching operation to modulate an amount of power supplied to the plurality of LEDs by switching between at least a first non-zero power level and a second non-zero power level so as to cause an average of the power supplied to the plurality of LEDs to be equal to a target power level.

17. The device of claim 16, further comprising:

a current sensor configured to sense the current, and a controller configured to control the switching operation of the switching device in response to the sensed current.

18. The device of claim 17, further comprising a voltage sensor configured to sense an LED voltage from the plurality of LEDs that appears across the output of the rectifier, wherein the controller is further configured to control the switching operation of the switching device in response to the sensed LED voltage.

19. The device of claim 16, further comprising the plurality of LEDs.

20. The device of claim 19, wherein the LEDs in the string include a first subset of LEDs and a second subset of LEDs, wherein the apparatus further includes a bridging diode connected in series in between the first subset of LEDs and the second subset of LEDs in the string, and wherein the apparatus further comprises a second switching device, wherein the switching device is connected in parallel with a series combination of the first subset of LEDs and the bridging diode, and wherein the second switching device is connected in parallel with a series combination of the second subset of LEDs and the bridging diode.

\* \* \* \* \*